United States Patent
Qian et al.

(10) Patent No.: US 8,071,934 B2
(45) Date of Patent: Dec. 6, 2011

(54) METHOD AND SYSTEM FOR DETECTING SINGLE-SHOT PULSE CONTRAST BASED ON FIBER ARRAY

(75) Inventors: Liejia Qian, Shanghai (CN); Dongfang Zhang, Shanghai (CN); Peng Yuan, Shanghai (CN); Heyuan Zhu, Shanghai (CN)

(73) Assignee: Fudan University, Yangpu District, Shanghai (CN)

( * ) Notice: Subject to any disclaimer, the term of this patent is extended or adjusted under 35 U.S.C. 154(b) by 402 days.

(21) Appl. No.: 12/343,471

(22) Filed: Dec. 23, 2008

(65) Prior Publication Data

US 2010/0155585 A1 Jun. 24, 2010

(30) Foreign Application Priority Data

Dec. 19, 2008 (CN) .......................... 2008 1 0207458

(51) Int. Cl.
*G01J 1/04* (2006.01)
*G01J 4/00* (2006.01)
*H01J 40/14* (2006.01)
*G02B 6/26* (2006.01)
*G02B 6/04* (2006.01)

(52) U.S. Cl. .............. 250/227.14; 250/227.18; 250/226; 385/39; 385/115

(58) Field of Classification Search ................... 250/216, 250/226, 227.11, 227.14, 227.18, 227.19, 250/227.23, 227.28; 385/4, 9, 12, 39–48, 50–52, 55, 59–60, 71–72, 88–91, 115; 359/308, 341.1, 341.2, 502, 561; 356/303, 319, 320, 460, 484, 151, 414, 416, 419

See application file for complete search history.

(56) References Cited

U.S. PATENT DOCUMENTS

| | | | |
|---|---|---|---|
| 5,618,108 A * | 4/1997 | Sai et al. | 374/161 |
| 6,795,617 B2 * | 9/2004 | Dinu et al. | 385/42 |
| 7,103,282 B2 * | 9/2006 | White | 398/155 |
| 7,403,142 B2 * | 7/2008 | Hirono et al. | 341/137 |
| 2003/0235381 A1 * | 12/2003 | Hunt | 385/122 |

* cited by examiner

*Primary Examiner* — Kevin Pyo
*Assistant Examiner* — Don Williams

(57) ABSTRACT

A system for detecting single-shot pulse contrast includes a correlator generating a correlation signal, a spectral filter filtering light signals having wavelengths different from the correlation signal, a fiber array comprising a plurality of fibers with different lengths for transmitting the correlation signal in parallel forming parallel correlation signals, and a fiber bundle bounding the fibers at the end thereof for converging the parallel correlation signals, wherein due to different lengths of the fibers, the parallel correlation signals are converted into serial correlation signals at end of the fibers, a plurality of fiber attenuators spliced into at least one of the fibers respectively for attenuating the parallel correlation signals, a detector for detecting the serial correlation signals to produce analog signals, an A/D convertor converting the analog signals to digital signals, and a computer for processing the digital signals for retrieving the single-shot pulse contrast.

20 Claims, 2 Drawing Sheets

METHOD AND SYSTEM FOR DETECTING SINGLE-SHOT PULSE CONTRAST BASED ON FIBER ARRAY

BACKGROUND OF THE INVENTION

1. Field of Invention

The present invention relates to a laser pulse measurement technique, and more specifically to a method and system for detecting single-shot pulse contrast based on fiber array.

2. Description of Related Arts

Any discussion of the prior art throughout the specification should in no way be considered as an admission that such prior art is widely known or forms part of common general knowledge in the field.

Focused intensity in excess of $10^{20}$ W/cm$^2$ now can be reached by high-power laser systems based on chirp pulse amplification, which may find many applications such as plasma physics, high-order harmonic generation, inertial confinement fusion, or quantum electrodynamics. In the systems with such high intensities, however, reflections, scattering, amplified spontaneous emission, or incomplete temporal compression may result in considerable pedestal or pre-pulses and post-pluses. The contrast, defined by the ratio of the peak intensity of the main pulse to its background, especially in the leading part, is therefore one of the most important parameters of a high-power laser pulse. For example, the absolute intensity of the long pedestal or pre-pulse must be under the threshold of pre-plasma generation for a clean light-matter interaction experiment. The higher the peak intensity, the higher the contrast is required. This, of course, necessitates a more delicate design of the laser system and/or pulse's cleaning technique for higher peak intensity to meet the experiment criteria. On the other hand, it also challenges the diagnostic technique for pulse contrast, which is necessary for experimental data analysis and system optimization.

Current diagnostic techniques for pulse contrast are typically based on nonlinear correlation, in which a clean reference is obtained by second-harmonic generation (SHG) of the to-be-characterized pulse. Sum-frequency generation (SFG) or difference-frequency generation (DFG) may serve as the nonlinear process for correlation, and the dependence of the third harmonics or the idler on temporal delay is measured to reveal the information of the shape and contrast of the primary pulse. One of the most important specifications of such an instrument is its dynamic range, which determines the ability to distinguish the utmost difference of the signal levels. For a specific detection system the strongest signal detected must be kept below the saturation level, which is accomplished commonly by attenuation using a calibrated neutral density filters(s) [NDF(s)]. At the low end, the noise level sets the bottom limit of the detectable signal. The noise level sets the bottom limit of the detectable signal. The noise limit is indeed the most severe problem that restricts the obtainable dynamic range. Stray light suppression and using detector with low noise and high sensitivity are thus preferable. In a time-scanning configuration for characterizing repetitive pulses, a lock-I amplifier or boxcar averager may be used to increase the dynamic range by 1-2 orders of magnitude. In addition, a larger dynamic range could be achieved in principle by further increasing the intensity of the input beam while increasing the attenuation of the signal peak.

Although a dynamic range in excess of $10^{11}$:1 has been demonstrated for repetitive millijoule input pulses in a time-scanning mode, it is typically about $10^6$-$10^7$:1 for single-shot technique, which is especially desirable for high energy/high-power laser systems operating at extremely low repetition rate or even non-repetitively, the information of the shape and contrast is obtained from an isolated pulse. Third-order correlation based on SHG-SFG cascaded processes is widely used. Variation of the time delay is realized by intersecting the two interacting beams and/or tilting the pulses onto the SFG crystal, and the correlation in time is then transformed into a spatial intensity distribution. Currently the pulse correlation trace in a single-shot measurement is recorded by a multi-element detector capable of parallel measurement such as a diode array. To increase the measurable contrast a calibrated attenuator is normally positioned to reduce the central portion of the signal while leaving the low-level pedestal un-attenuated. The poorer dynamic range in a single-shot mode, when compared to that of a time-scanning mode, is largely due to the performance limits in its detection system. The attenuator for the central signal reduction, the width of which is narrower than that of the signal beam, will inevitably introduce extra noise through edge scattering or diffraction. Furthermore, the diode array for parallel measurement is much less sensitive than a photomultiplier tube (PMT) in a time-scanning setup, particularly when techniques for improving the signal-to-noise ratio, such as lock-in amplification or boxer averaging, are precluded in a single-shot measurement.

BRIEF SUMMARY OF THE INVENTION

In the present invention, a fiber-array-based acquisition system for detecting single-shot pulse contrast or pulse shape is provided. The technique is designed to overcome the above-mentioned limitations of existing instruments. In particular, the technique eliminates the external NDF and allows a low-noise high-sensitivity detector, such as PMT, to accomplish the parallel measurement, achieving significantly improved dynamic range in a single-shot measurement.

A system for detecting single-shot pulse contrast comprises:

a correlator for generating a correlation signal, a spectral filter receiving the correlation signal and filtering light signals having wavelengths different from the correlation signal, a fiber array comprising a plurality of fibers with different lengths aligned from a shortest length to a longest length for transmitting the correlation signal in parallel forming parallel correlation signals, and a fiber bundle bounding the plurality of fibers at the end thereof for converging the parallel correlation signals, wherein due to different lengths of the fibers, the parallel correlation signals are converted into serial correlation signals at end of the fibers of the fiber array, at least one fiber attenuators spliced into at least one of the fibers respectively for attenuating the parallel correlation signals, a detector for receiving and detecting the serial correlation signals to produce analog signals, an A/D convertor converting the analog signals to digital signals, and a computer for receiving and processing the digital signals for retrieving the single-shot pulse contrast.

A method for detecting single-shot pulse contrast comprises steps of:

(a) generating a correlation signal, (b) receiving the correlation signal, and filtering light signals that have wavelengths different from the correlation signal, (c) transmitting the correlation signal in parallel forming parallel correlation signals, wherein each parallel correction signal has different time delay, and after the transmission, converging the parallel correlation signals for converting the parallel correlation signals to serial correlation signals, (d) attenuating the parallel correlation signals while transmitting, (e) detecting the serial correlation signals to produce analog signals, (f) converting the analog signals to digital signals, and (g) processing the digital signals for retrieving the single-shot pulse contrast.

DETAILED DESCRIPTION OF THE INVENTION

Figure 1:
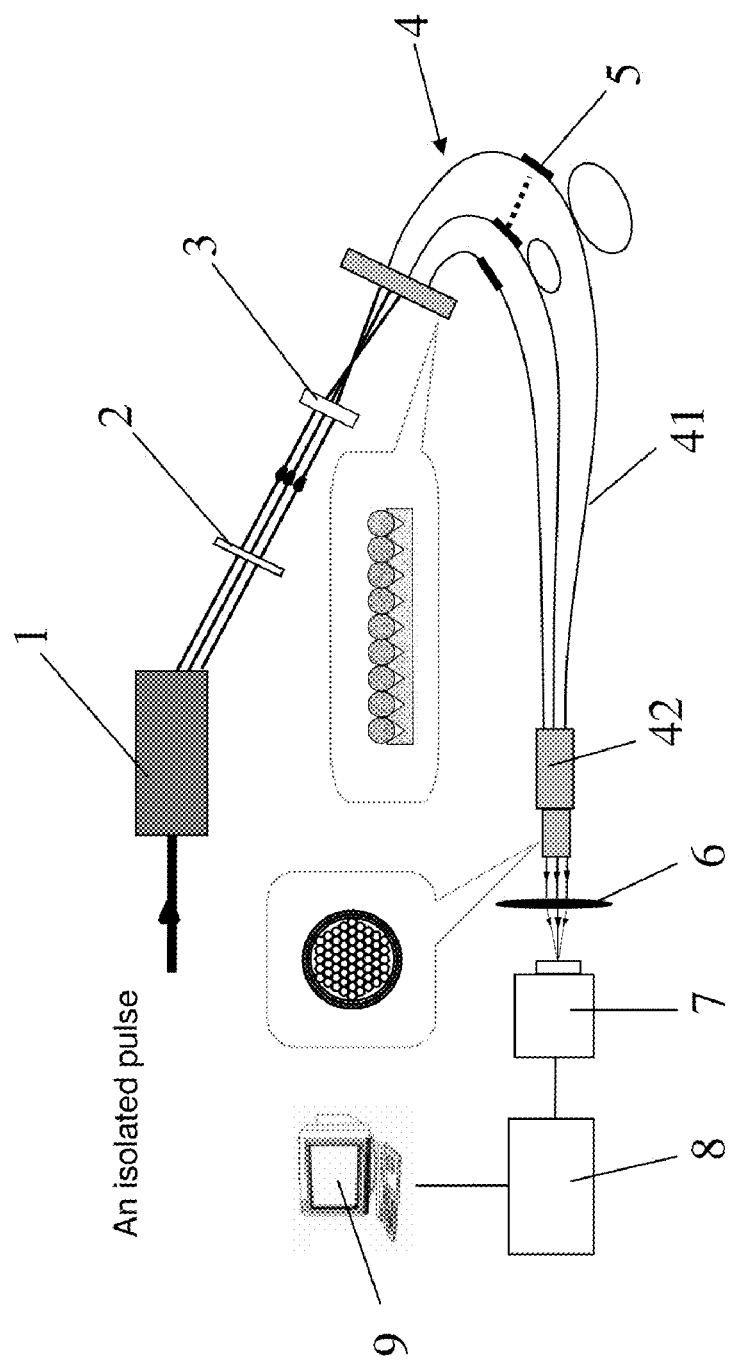
FIG. 1 is a schematic view of a system for detecting single-shot pulse contrast according to a preferred embodiment of the present invention.

Referring to FIG. 1 of the drawings, a system for detecting single-shot pulse contrast and pulse shape is illustrated, which includes a correlator 1, a spectral filter 2, a fiber array 4 comprising a plurality of fibers 41 and a fiber bundle 42, at least one fiber attenuators 5, a detector 7, an A/D convertor 8, and a computer 9.

The correlator 1 generates a correlation signal after receiving an isolated pulse. The correlator 1 can be embodied as a SHG-DFG configuration or SHG-SFG configuration that can produces a correlation signal from an isolated pulse. The spectral filter 2 receives the correlation signal and filters the light signals with wavelengths different from the correlation signal.

The fiber array 4 comprises a plurality of fibers 41 with different lengths aligned from a shortest length to a longest length respectively for transmitting the correlation signals in parallel forming parallel correlation signals, and a fiber bundle 42 aligning and bounding the plurality of fibers 41 at the end thereof for converging the parallel correlation signals, wherein due to different lengths of the fibers 41, the parallel correlation signals are converted into serial correlation signals at end of the fibers 41 of the fiber array 4.

At least one fiber attenuator 5 is spliced into at least one of the plurality of fibers 41 respectively for attenuating the correlation signals to the dynamic range of the detector. For example, a plurality of the fiber attenuators 5 are spliced into part of the fibers 41 or all of the fibers respectively for attenuating the correlation signals. The detector 7 receives the serial correlation signals from the fiber bundle 42 and produces analog signals. The A/D converter 8 converts the analog signals into digital signals. The computer 9 receives and processes the digital signals for retrieving the single-shot pulse contrast.

The fibers 41 have different lengths aligned from the shortest to the longest length respectively. The length differences between the each two adjacent fibers can be the same or vary. Preferably, the fibers are aligned side by side from the fiber of shortest to the longest length, and the length of each fiber will increase with respective to the successive fiber with a certain value.

The length differences between the fibers result in the time difference of the parallel correlation signals transmitted in the fibers, so that when the parallel correlation signals can be converted into the serial correlation signals at the end of the fibers, which can be detected by a single element detector 7. The resulting time delay due to the length difference should be larger than the response time of the detector 7.

In the present invention, the correlator 1 converts a temporal signal into a spatially distributed correlation signal. Due to the different lengths of the fibers, at the end of the fibers, the spatially distributed correlation signals transmitted in parallel are converted into a serial of temporally separated signals. This enables us to use only a single element detector instead of multi-element detector to accomplish the task. Therefore, the detector 7 is a single element detector, such as a PMT or a photo diode. The PMT of high sensitivity is preferably used in the preferred embodiment.

The system for detecting the single-shot pulse contrast further comprises an imaging lens 3 provided between said spectral filter and said fiber array for allowing the correlation signal passing therethrough, and further couple the correlation signals and the fiber array 4. The system for detecting the single-shot pulse contrast further comprises a focusing lens 6 provided between the fiber bundle 42 and the detector 7 so as to ensure that all the serial correlation signals do not exceed the effective area of the detector.

The fiber attenuators 5 may have fixed attenuation factor or variable attenuation factor. It is worth mentioning that when using the fiber attenuator with a fixed attenuation factor, you have to make sure the correlation signals, especially the peak part of the correlation signals, are attenuated to a level within the dynamic range of the detector. Therefore, the fiber attenuator with a variable attenuation factor is preferably used. The attenuation factor can be adjusted at different situations. For example, the attenuation factor of the fiber attenuato2 at the peak part of the correlation signals is adjusted to a relatively large value comparing to the attenuation factor of the fiber attenuator at other part of correlation signals, so as to attenuate all the correlation signals to a level within the dynamic range of the detector.

While processing the digital signals, the computer 9 retrieves the isolated pulse by combining the attenuation factor introduced by the fiber attenuators and the fiber itself.

As an example, the isolated pulse is an output from a Ti:sapphire regenerative amplifier (Spitfire, Spectra-Physics) with a pulse energy of 400 µJ, duration of 70 fs, and wavelength of 800 nm was used as the initial source. The fiber array consists of 61 fibers with different lengths, which are fabricated by a high precision V-groove-base technique. Each fiber has a core diameter of 62.5 um and an NA of 0.275 and the width of the array is ~7.75 mm. The fiber length range from ~1 m (the first fiber) to ~91 m (the 61st fiber), with a ~1.5 m increment between successive fibers, which corresponds to a temporal interval of ~7.3 ns corresponding to a wavelength of 800 nm. Calibrated fiber attenuators were spliced into the central fibers, with a fixed attenuation factor of 100 for fiber from the $27^{th}$ to the $31^{st}$, and an attenuation factor of 32 for fibers from the $24^{th}$ to the $26^{th}$ and from the $32^{nd}$ to the $34^{th}$.

The system for detecting the single-shot pulse contrast further comprises a NDF with an attenuation factor of 50,000 used to attenuate the overall intensity of the signals before reaching the detector. The PMT (R5108, Hammamatsu) operating at −1260V bias was used to capture the output light from the fiber bundle, the output of which was sent to an analog-to-digital converter followed by a personal computer for further data processing. The response time of ~1.2 ns of the PMT was fast enough to resolve the serially delivered DFG intensity profile because the designed temporal separation between two adjacent fibers was sufficiently large (i.e., ~7.3 ns).

Figure 2:
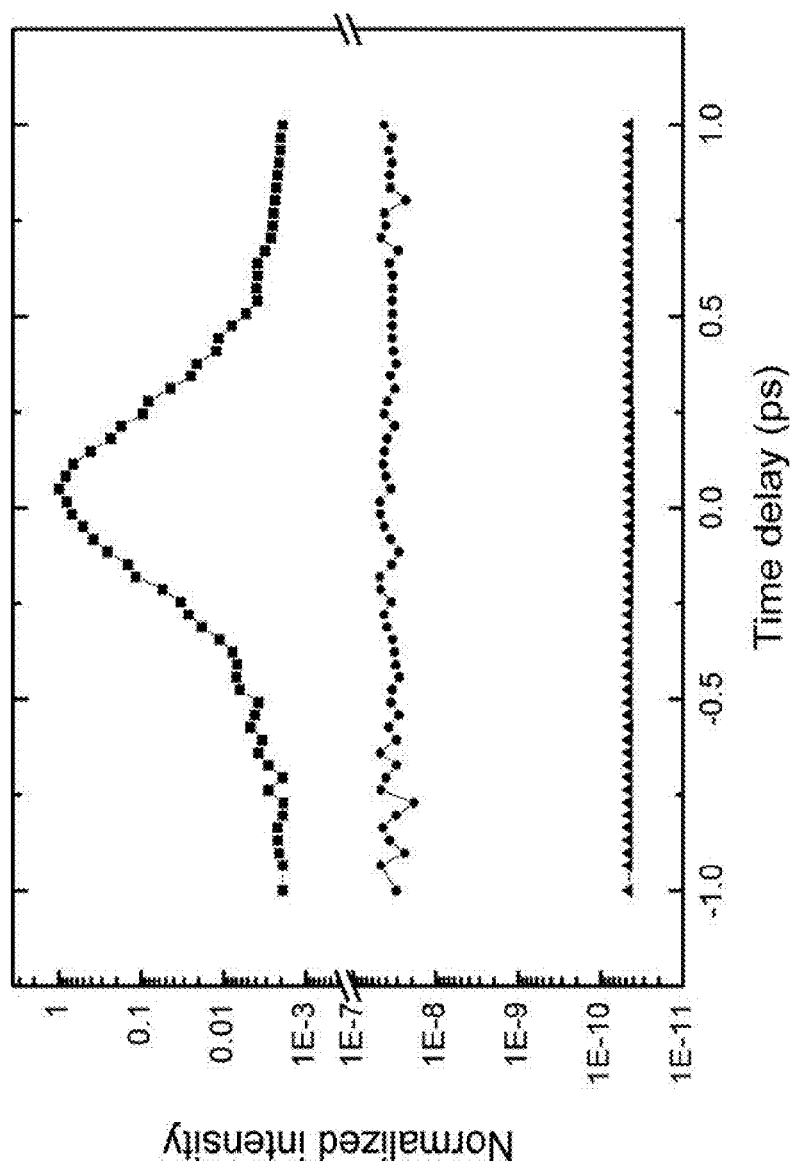
FIG. 2 is a diagram showing a retrieved shape of the isolated pulse according to a preferred embodiment of the present invention.

FIG. 2 shows the retrieved shape of the fundamental pulse. The limit on the measurable contrast ratio was determined by optical noise level at the DFG wavelength (the fundamental wavelength in this case). The dominant noise source came from light scattered into the DFG signal from the fundamental beam. By blocking the second-harmonic beam the noise level was measured using data shown in FIG. 2. The measured optical noise was slightly non-uniform across the fiber array, which suggests that scattering of the fundamental beam may be non-uniformly distributed in both the spatial and angular domains. Although the pulse shape and the optical noise level were measured with different shots, it is reasonable to assume that variations for different shots are negligible owing to the high stability of the laser source used. The dynamic range under the present conditions was estimated to be $2\times10^7:1$. Nonetheless, the fiber-array-based acquisition offers two additional advantages in reducing the optical noises: (1) the exclusion of a conventional external NDF avoided extra noise contribution and (2) each fiber itself acted as a spatial filter, which suppressed the scattering noise to some extent owing to its limited NA and core diameter. Higher dynamic range can be achieved if a non-degenerate scheme, e.g., third-harmonic generation (THG), is used where spectral filtration can be applied to further suppress the scattering from both the fundamental and second-harmonic components.

The demonstrated technique can be readily applied to existing instruments for single-shot pulse contrast characterization.

A method for detecting the single-shot pulse contrast comprises steps of:

(a) generating a correlation signal from an isolated pulse, (b) receiving the correlation signal, filtering light signals that have wavelengths different from the correlation signal, (c) transmitting the correlation signal in parallel forming parallel correlation signals, wherein each parallel correction signal has different time delay, and after the transmission, converging the parallel correlation signals for converting the parallel correlation signals to serial correlation signals, (d) attenuating the parallel correlation signals while transmitting, (e) detecting the serial correlation signals to produce analog signals, (f) converting the analog signals to digital signals, and (g) processing the digital signals for retrieving the single-shot pulse contrast.

In step (c), the correlation signal is transmitted in a fiber array comprising a plurality of fibers with different lengths in parallel forming parallel correlation signals, wherein each parallel correlation signal has different the time delay, due to different lengths of the plurality of fibers. The step (c) further comprises a step of bounding the fibers at the end thereof for converting the parallel correlation signals into serial correlation signals at the end of the fibers.

Step (d) is accomplished by at least one fiber attenuator spliced into at least one of the fibers respectively, and step (e) is accomplished by a detector, for attenuating the signals to a level within the dynamic range of the detector. The fiber attenuator has a variable attenuation factor or a fixed attenuation factor. When the fiber attenuator of variable attenuation factor is used in the present invention, the method for detecting the single-shot pulse contrast comprises step of adjusting an attenuation factor for suppressing the correlation signals.

Furthermore, adjust the attenuation factor to a relative large value for suppressing the peak part of the correlation signals comparing to the attenuation factor of other part of the correlation signals.

Before step (e), the method for detecting single-shot pulse contrast further comprises a step of focusing the series correlation singles so as to ensure that all the serial correlation signals do not exceed the effective area of the detector.

While processing the digital signals, step (g) further comprises a step of retrieving the signals by combining the attenuation factor introduced by the fiber attenuators and the fiber itself.

One skilled in the art will understand that the embodiment of the present invention as shown in the drawings and described above is exemplary only and not intended to be limiting. Any variation on the theme and methodology of accomplishing the same that are not described herein would be considered under the scope of the present invention.

What is claimed is:

1. A system for detecting single-shot pulse contrast characterization, comprising:

a correlator for a generating correlation signal from an isolated pulse, wherein said correlator converts said temporal isolated signal into said spatially distributed correlation signal;

a spectral filter receiving said correlation signal and filtering light signals having wavelengths different from said correlation signal, a fiber array comprising a plurality of fibers with different lengths for transmitting said correlation signal in parallel forming parallel correlation signals, and a fiber bundle bounding said plurality of fibers at the end thereof for converging said parallel correlation signals, wherein due to different lengths of said fibers, said parallel correlation signals are converted into serial correlation signals at the end of said fibers of said fiber array, at least one fiber attenuators spliced into at least one of said plurality of fibers respectively for attenuating said parallel correlation signals, a detector for detecting said serial correlation signals to produce analog signals, an A/D convertor converting said analog signals to digital signals, and a computer for processing the digital signals for retrieving the single-shot pulse contrast characterization.

2. The system for detecting single-shot pulse contrast characterization, as recited in claim 1, wherein said fibers are aligned side by side from the fiber of shortest to the longest length, wherein a length of each fiber will increase with respective to a successive fiber with a predetermined value.

3. The system for detecting single-shot pulse contrast characterization, as recited in claim 2, further comprising an imaging lens provided between said spectral filter and said fiber array for allowing said correlation signal passing therethrough, and further couple said correlation signals and said fiber array.

4. The system for detecting single-shot pulse contrast characterization, as recited in claim 3, further comprising a focusing lens provided between the fiber bundle and the detector.

5. The system for detecting single-shot pulse contrast characterization, as recited in claim 4, wherein said fiber attenuators may have fixed attenuation factor or variable attenuation factor.

6. The system for detecting single-shot pulse contrast characterization, as recited in claim 4, further comprising a NDF with an attenuation factor for attenuating an overall intensity of said correlation signals before reaching said detector.

7. The system for detecting single-shot pulse contrast characterization, as recited in claim 2, wherein said correlator is a SHG-DFG configuration or a SHG-SFG configuration.

8. The system for detecting single-shot pulse contrast characterization, as recited in claim 2, wherein said fiber attenuators may have fixed attenuation factor or variable attenuation factor.

9. The system for detecting single-shot pulse contrast characterization, as recited in claim 2, wherein said detector is a single element detector.

10. The system for detecting single-shot pulse contrast characterization, as recited in claim 1, further comprising an imaging lens provided between said spectral filter and said fiber array for allowing said correlation signal passing therethrough, and further couple said correlation signals and said fiber array.

11. The system for detecting single-shot pulse contrast characterization, as recited in claim 1, further comprising a focusing lens provided between the fiber bundle and the detector.

12. The system for detecting single-shot pulse contrast characterization, as recited in claim 1, wherein said correlator is a SHG-DFG configuration or a SHG-SFG configuration.

13. The system for detecting single-shot pulse contrast characterization, as recited in claim 1, wherein said fiber attenuators may have fixed attenuation factor or variable attenuation factor.

14. The system for detecting single-shot pulse contrast characterization, as recited in claim 1, wherein said detector is a single element detector.

15. The system for detecting single-shot pulse contrast characterization, as recited in claim 14, wherein said detector is a PMT.

16. The system for detecting single-shot pulse contrast characterization, as recited in claim 14, wherein said detector is a photo diode.

17. The system for detecting single-shot pulse contrast characterization, as recited in claim 1, further comprising a NDF with an attenuation factor for attenuating an overall intensity of said correlation signals before reaching said detector.

18. A method for detecting single-shot pulse contrast characterization, comprising steps of:
   (a) generating a correlation signal from an isolated pulse, wherein said correlator converts said temporal isolated signal into said spatially distributed correlation signal;
   (b) filtering light signals that have wavelengths different from said correlation signals;
   (c) transmitting said correlation signal in parallel forming parallel correlation signals, wherein each parallel correction signal has different time delay, and after the transmission, converging said parallel correlation signals for converting said parallel correlation signals to serial correlation signals;
   (d) attenuating said parallel correlation signals while transmitting;
   (e) detecting said serial correlation signals to produce analog signals;
   (f) converting said analog signals to digital signals; and
   (g) processing said digital signals for retrieving the single-shot pulse contrast characterization.

19. The method for detecting single-shot pulse contrast characterization, as recited in claim 18, further comprising step of adjusting an attenuation factor for suppressing said correlation signals.

20. The method for detecting single-shot pulse contrast characterization, as recited in claim 19, further comprising step of setting said attenuation factor for suppressing a peak part of the correlation signals larger than said attenuation factor for suppressing other part of said correlation signals.

* * * * *